April 4, 1967   J. J. CUNHA   3,312,479
LOAD DISTRIBUTING TRACTOR-TRAILER ASSEMBLY
Filed March 15, 1966   3 Sheets-Sheet 1

INVENTOR.
JOSEPH J. CUNHA
BY
Naylor & Neal
ATTORNEYS

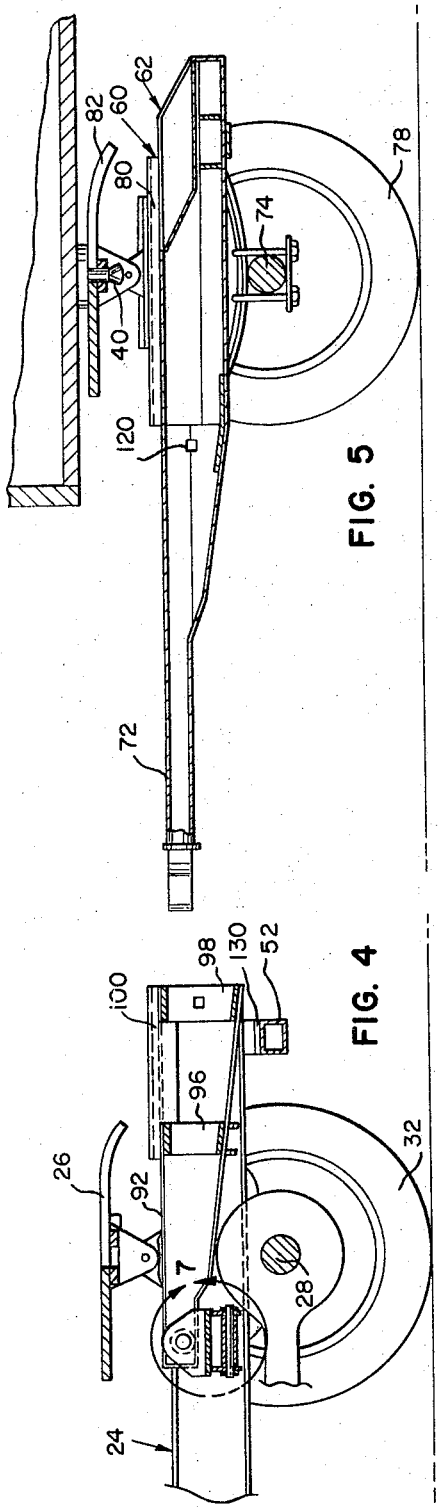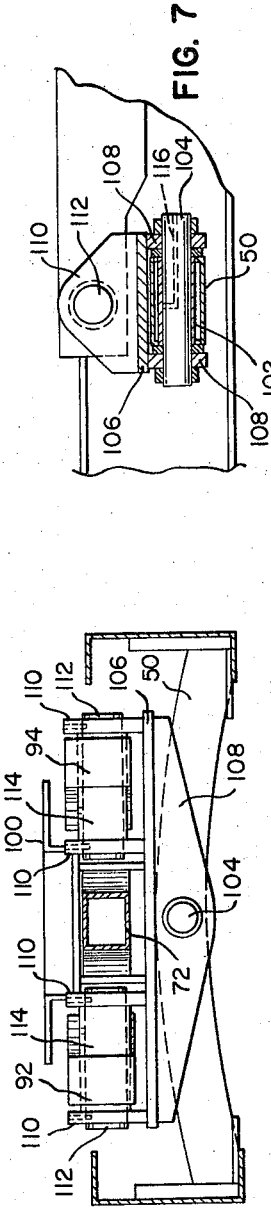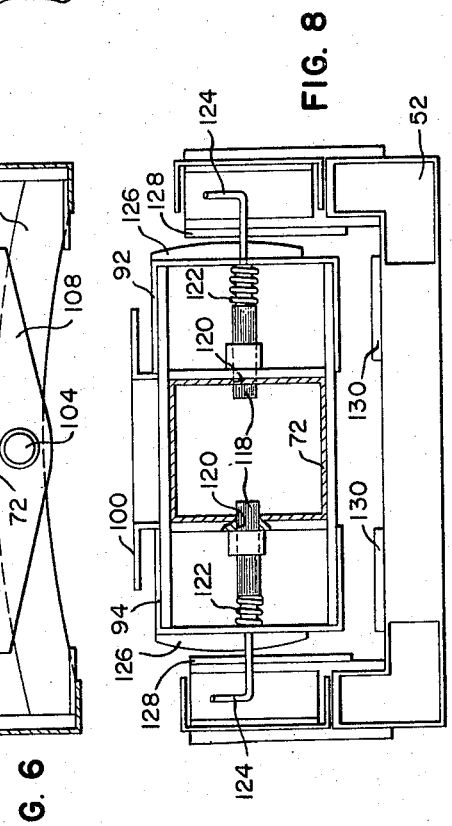

April 4, 1967   J. J. CUNHA   3,312,479
LOAD DISTRIBUTING TRACTOR-TRAILER ASSEMBLY
Filed March 15, 1966   3 Sheets-Sheet 3

INVENTOR.
JOSEPH J. CUNHA
BY
ATTORNEYS

United States Patent Office 3,312,479
Patented Apr. 4, 1967

3,312,479
LOAD DISTRIBUTING TRACTOR-TRAILER
ASSEMBLY
Joseph J. Cunha, Castro Valley, Calif., assignor to Cunha Products Incorporated, Castro Valley, Calif., a corporation of California
Filed Mar. 15, 1966, Ser. No. 534,337
9 Claims. (Cl. 280—407)

This is a continuation-in-part of my co-pending application, Ser. No. 334,766, filed Dec. 31, 1963, now Patent No. 3,246,912.

The present invention relates to an improved load distributing tractor-trailer coupling assembly of the type disclosed in my aforementioned application and, more particularly, is directed to such an assembly of increased flexibility. In its more specific aspects, the present invention is directed to such an assembly wherein provision is made to maintain both the tractor driving wheels and the auxiliary supporting wheels in surface engagement irrespective of the surface conditions encountered.

Although the tractor-trailer coupling assembly of my aforementioned application has met with great commercial acceptance and has proved both reliable and effective, it has been found to have certain shortcomings when used on irregular surfaces and rough terrains. Specifically, when the coupling assembly of my aforementioned application is run over irregular surfaces, such as severe dips and curbings, it is possible for either the drive wheels or the auxiliary support wheels to "hang up" in suspended condition. This condition can result because the tractor and auxiliary support dolly chassis in my aforementioned application are rigidly connected in normal use and, thus, lifting forces imparted to one chassis by the wheels thereof are directly imparted to the other chassis. Naturally, when "hang up" occurs, the load imparted to the wheels in surface engagement is increased and, if the driving wheels are in suspended condition, the tractor is immobilized.

It is to be understood that the "hang up" condition encountered with the assembly of my aforementioned application only results under severe operating conditions. This assembly has proved very effective and reliable for normal highway use and, because of the resilient suspension employed therein, has even proved successful under mildly irregular surface conditions.

It is, accordingly, a principal object of the present invention to provide a load distributing coupling assembly to overcome the shortcomings of my aforementioned copending application which result under severe surface conditions.

Another, and more specific, object of the invention is to provide a load distributing assembly wherein load distribution and tractive wheel engagement is maintained under all surface conditions.

Still another object of the invention is to provide a load distributing assembly for use with tractor-semi-trailer combinations which does not raise the trailer center of gravity above that affected by conventional tractors.

A further object of the invention is to provide a load distributing assembly for use in tractor-semi-trailer combinations which may be employed with a minimum of conventional equipment alteration.

Another object of the invention is to provide a load distributing assembly for use with heavy tractor-semi-trailer combinations which is capable of reliably withstanding the rigors of use.

Yet another object of the invention is to provide a load distributing assembly for use with tractor-semi-trailer combinations which permits the tractor to be used in a conventional manner when the assembly is not required.

With respect to this object, it is a further object of the invention to provide such an assembly incorporating a load distributing dolly which may be employed as a conventional dolly when not being utilized in its load distributing capacity.

The present invention is intended for use in combination with a wheel supported draft vehicle having a load supporting chassis extending rearwardly therefrom and a vehicular semi-trailer having a first draft connection at its forward end and support wheels at its rearward end. The improved load distributing assembly of the invention is employed for coupling the first draft connection to the draft vehicle and basically comprises: a wheel supported dolly having a load supporting chassis disposed in coplanar relationship with the chassis of the draft vehicle; mating connecting means on the respective chassis to connect the chassis of the draft vehicle in draft and load supporting relationship to the chassis of the dolly for limited universal movement relative thereto; and, a second draft connection adapted to be supported on and between the draft vehicle and dolly when the chassis thereof are interconnected. The latter draft connection is adapted to be coupled in engagement with the first draft connection and, thus, the load of the trailer is supported on the chassis of both the tractor and the dolly.

The foregoing objects and the specifics of the invention will become more apparent when viewed in light of the following detailed description and accompanying drawings, wherein:

FIG. 4 is a sectional elevational view similar to FIG. 3, but showing the load distributing dolly of the inventive assembly removed from the tractor chassis;

FIG. 5 is a sectional elevational view illustrating the load distributing dolly of the inventive assembly removed from the tractor and supporting a semi-trailer in conventional manner;

FIG. 6 is a sectional view taken on the plane designated by line 6—6 in FIG. 2;

FIG. 7 is an enlarged sectional view of a portion of the view illustrated in FIG. 4, taken at the line 7 illustrated in the latter figure;

FIG. 8 is a sectional view taken on the plane designated by the line 8—8 in FIG. 2;

Figure 9:
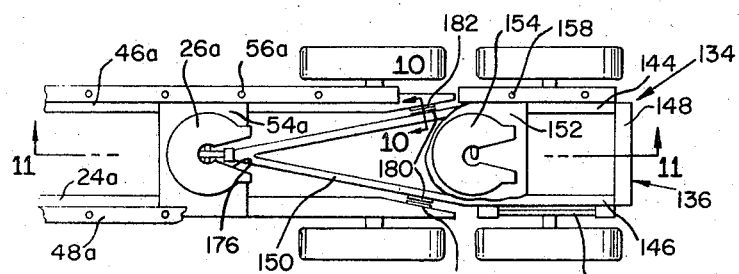
FIG. 9 is a plan view illustrating an alternative embodiment of the inventive load distributing assembly as employed on the rear load supporting chassis of a tractor.
Figure 10:
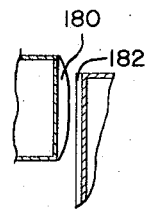
Figure 11:
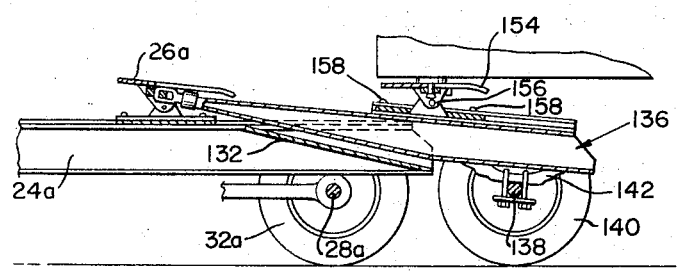
Figure 12:
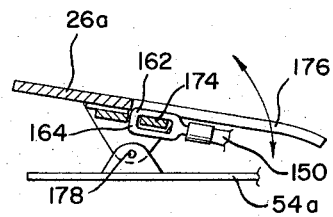
Figures 13, 14:
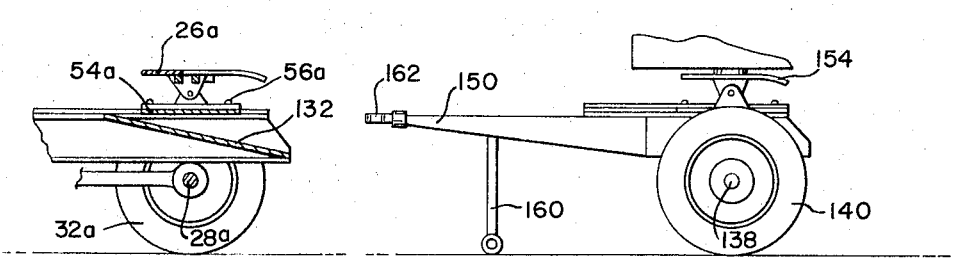
Figure 15:
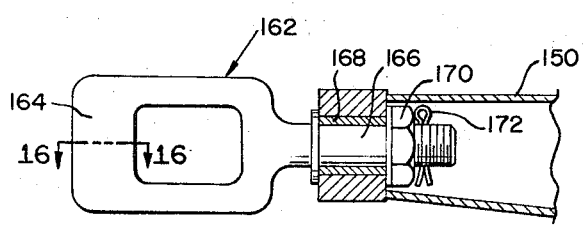
Figure 16:
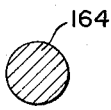

FIGS. 10 and 11 are sectional views taken on the planes designated by lines 10—10 and 11—11, respectively, in FIG. 9;

FIG. 12 is an enlarged sectional elevational view, similar to FIG. 11, illustrating the manner in which the load distributing dolly of the FIG. 9 embodiment is coupled to the tractor thereof;

FIG. 13 is a sectional elevational view, similar to FIG. 11, illustrating the tractor of the FIG. 9 embodiment with the load distributing dolly removed therefrom;

FIG. 14 is an elevational view illustrating the dolly of the FIG. 9 embodiment removed from the tractor and being employed to support a semi-trailer in conventional manner;

FIG. 15 is an enlarged sectional elevational view illustrating the coupling eye employed on the load distributing dolly of the FIG. 9 embodiment; and, FIG. 16 is a sectional view taken on the plane designated by the line 16—16 in FIG. 15.

Figure 1:
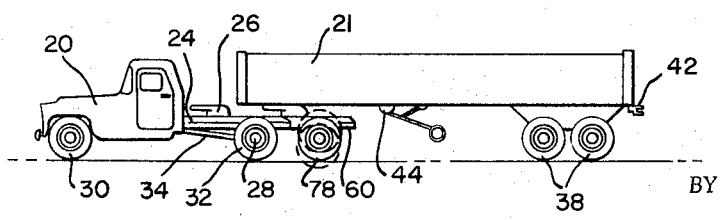
FIG. 1 is a side elevational view illustrating a tractor-trailer combination employing the load distributing assembly of the present invention.

Referring now specifically to FIG. 1 of the drawings, the numerals 20 and 21, respectively, therein designate a tractor and trailer of relatively conventional nature. The tractor 20 includes a load supporting chassis 24 extending rearwardly therefrom and having supported thereon a fifth wheel 26. The fifth wheel 26 is slidable on the chassis 24 between the inoperative forward position illustrated in FIG. 1 and an operative position disposed above the rearmost tractor axle, designated by the numeral 28. The tractor 20 is supported through steerable forward wheels 30 and rearward drive wheels 32. The latter wheels are mounted on the axle 28 and driven through a drive shaft 34 and differential 36 (see FIG. 3) of conventional nature.

Figure 3:
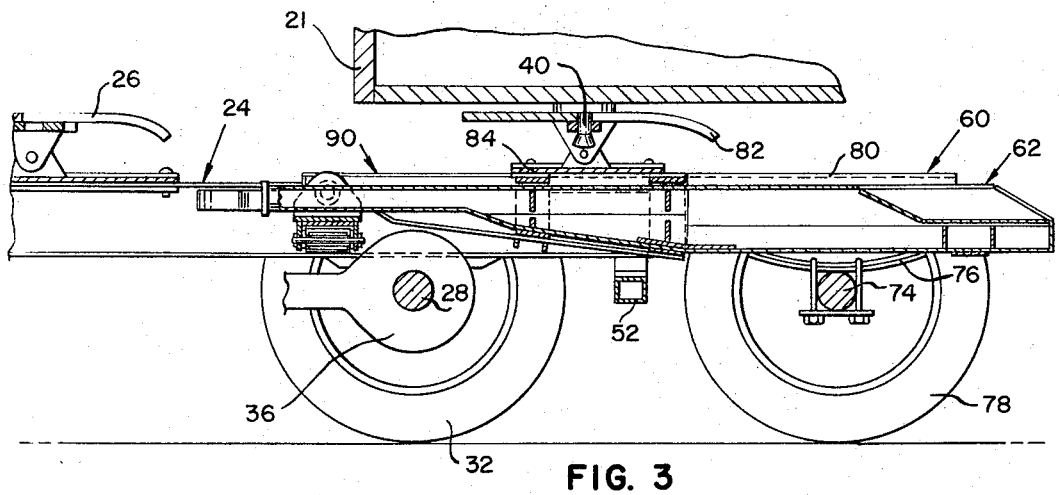
FIG. 3 is a sectional view taken on the plane designated by the line 3—3 in FIG. 2 and illustrating the manner in which the assembly of the present invention is employed in the support of a semi-trailer.

The trailer 21 is supported at the rearmost end thereof by wheels 38 and is provided at the forward end thereof with a fifth wheel engageable kingpin 40 (see FIG. 3). To provide for the attachment of additional trailing vehicles thereto, such as trailers or dollies, a clevis 42 is secured to the rearmost end of the trailer 21. A retractable landing gear 44 is mounted on the trailer 21 intermediate the ends thereof to effect trailer support when the kingpin 40 is disengaged from support by a fifth wheel.

Referring now specifically to the details of the embodiment illustrated in FIGS. 1 to 8, the tractor chassis 24 therein comprises lateral frame members 46 and 48 extending rearwardly from the tractor cab and having cross members 50 and 52 fixed therebetween (see FIGS. 6 and 8). The fifth wheel 26 is mounted for movement between the inoperative and operative positions illustrated in FIGS. 3 and 4 through means of a table mount 54 therefor slidably received on the frame members 46 and 48 for select movement therealong. Removable locking pins 56 are engageable through openings (not illustrated) provided therefor in the table and openings 58 in the frame members 46 and 48 to secure the table a select positions along the frame members.

The load distributing dolly of the FIG. 1 embodiment is designated in its entirety by the numeral 60 and includes a chassis 62 disposed in coplanar relationship with the chassis 24 of the tractor. The chassis 62 is defined by side frame members 64 and 66 connected by transverse members 68 and 70 having a tongue 72 fixed thereto and extending forwardly therefrom. The chassis 62 is supported by an axle 74 secured thereto by leaf springs 76, which axle is in turn supported on wheels 78 mounted thereon. A track 80 is mounted on the upper side of the chassis 62 and extends longitudinally thereof. As can be seen from FIG. 2, the track 80 slidably supports a fifth wheel 82 on the dolly for longitudinal movement therealong. Support of the fifth wheel is effected through means of a table 84 secured thereto and slidably received on the track 80. Removable pins 86 are extendable through alignable openings (not illustrated) in the table 84 and track 80 to lock the table at select positions along the track. The basic structure of the dolly 60 is completed by a towing eye 88 mounted on the forward end of the tongue 72. The eye 88 is employed when the dolly 60 is towed in conventional manner.

Figure 2:
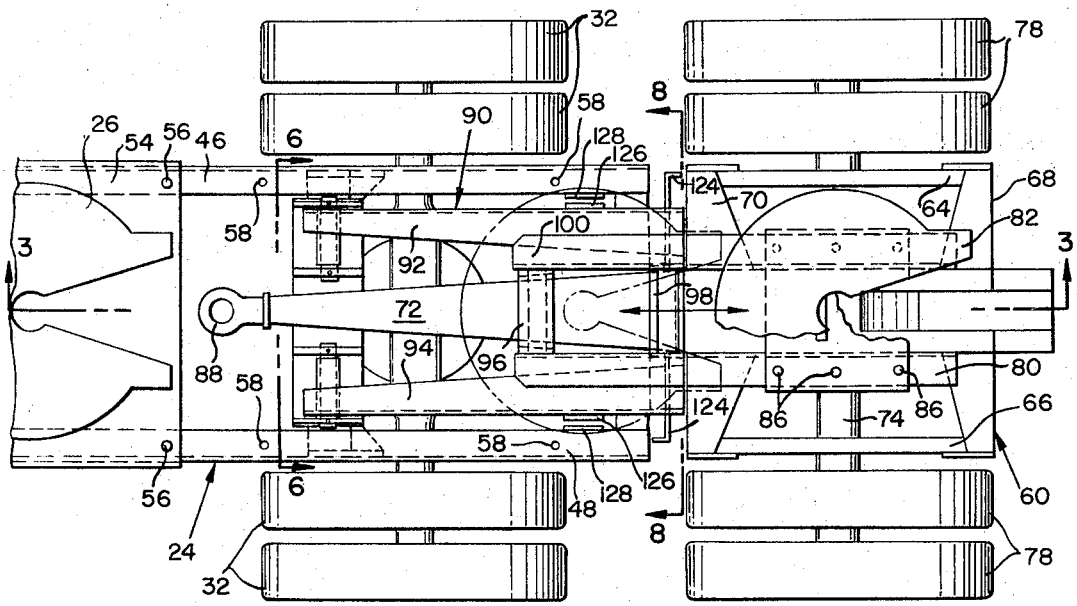
FIG. 2 is a plan view, partially in section, illustrating the rear support chassis of a tractor with the load distributing of the present invention employed therewith.

The chassis 24 and 62 are coupled in load distributing relationship as illustrated in FIGS. 1, 2 and 3 through means of respective connecting structures located thereon. The connecting structure on the chassis 24 of the tractor comprises a carriage, designated in its entirety by the numeral 90, mounted thereon for limited universal movement. The carriage 90 comprises side members 92 and 94 rigidly interconnected by transverse members 96 and 98 and having supported thereon a longitudinally extending track 100. The track 100, as can be seen from FIGS. 2 and 3, is adapted to assume a position aligned with the track 80 when the tractor chassis 24 is connected to the dolly chassis 62. In this condition, the fifth wheel is slidable along the aligned tracks to a position (as seen in FIG. 3) locked between the respective chassis.

The carriage 90 is mounted on the chassis 24 for limited universal movement through means of structure comprising: a sleeve trunnion 102 fixed to the cross member 50 and having a pivot axis extending longitudinally of the tractor chassis 24; a cylindrical bearing 104 received in the trunnion 102 for pivotal movement about the axis thereof; a beam 106 supported on the bearing 104 through means of ears 108 fixed thereto and secured in supporting relationship to the bearing 104; trunnion support ears 110 fixed to and extending upwardly from the beam 106 and having mounted therebetween cylindrical trunnions 112 having aligned axes extending transversely on the chassis 24; and, sleeve bearings 114 fixedly secured to the side members 92 and 94 of the carriage 90 and pivotally received on the trunnions 112. Through this arrangement, the carriage 90 is free to pivot universally about the longitudinal axis defined by the trunnion 102 and the transverse axis defined by the trunnions 112. It is noted that suitable lubrication means, such as the grease passage 116 illustrated in the bearing 104, may be provided to lubricate the trunnions.

The connecting structure on the dolly 60 simply comprises the tongue 72, which tongue is engageable with the carriage 90. To facilitate engagement of the carriage 90 and tongue 72, coupling structure, in the form of a female wedge defined by the transverse members 96 and 98 of the carriage and a mating male wedge defined by the external surfaces of the tongue 72 is provided. The manner in which these wedges mate snugly is illustrated in FIG. 8. From the latter figure, it can also be seen that locking detents, in the form of spring biased bolts 118 on the carriage 90 and openings 120 in the tongue 72 provide for the locking of the wedges in mated relationship. The bolts 118 are normally biased to the engaged position illustrated in FIG. 8 by springs 122 and may be manually retracted to permit removal of the tongue 72 through means of retraction grips 124. Thus, it can be seen that the tongue 72 is adapted to be selectively engaged in the carriage 90 and that this engagement may be selectively locked through means of the bolts 118.

Lateral movement of the carriage 90 and resultant strain on the trunnion 102 is prevented by wear shoes 126 mounted on either side of the carriage for sliding engagement with complementary wear shoes 128 mounted on the lateral frame members 46 and 48. The degree to which the carriage may rock about the trunnions 112 is limited by resilient bumper pads 130 mounted on the cross member 52 beneath the rearmost end of the carriage. These pads are positioned to support the carriage when in the disengaged condition illustrated in FIG. 4. However, the pads do not interfere with pivotal movement of the carriage about the trunnions 112 during normal operation when the carriage is connected to the dolly 60.

From the foregoing description, it can be seen that the tractor chassis 24 and dolly chassis 62 may be selectively connected in substantially coplanar relationship. When so connected, the dolly chassis is free to move, to a predetermined extent, universally relative to the tractor chassis and, thus, the support wheels 78 of the dolly chassis may raise and lower to accommodate irregular surfaces. The manner in which the wheels 78 may move is exemplified by the phantom line illustrations thereof in FIG. 1. It is noted that, in addition to moving up and down as a unit, the wheels to either side of the dolly longitudinal center line may raise or lower substantially independently. This results because of the pivotal action provided by the trunnion 102.

When employing the assembly of the FIGS. 1 to 8 embodiment to effect load distribution, the tractor fifth wheel 26 is first moved forward to the inactive condition illustrated in FIGS. 1, 2 and 3, and then retained in position by the pins 56. After the fifth wheel 26 is moved to the inactive condition, the tongue 72 is engaged in the carriage 90 and locked in place through means of the locking bolts 118. At this point, the dolly fifth wheel 82 is moved forwardly on the aligned tracks 80 and 100 to a position substantially midway between the tractor axle 28 and the dolly axle 74. In this condition, load supported on the fifth wheel 82 is distributed substantially equally between the axles 28 and 74. Thus, the assembly functions to provide two support axles in place of the single tractor support axle and to distribute the load equally between these axles.

When it is desired to return the tractor 20 to the conventional condition illustrated in FIG. 4, it is simply necessary to remove the tongue 72 from the carriage 90 and return the tractor fifth wheel 24 to a position substantially above the tractor axle 28. In the latter condition, the tractor fifth wheel 24 may be utilized to support a semi-trailer in conventional manner. When the dolly chassis 62 is disconnected from the tractor chassis 24, the dolly may also be utilized to support a semi-trailer in conventional manner, as is illustrated in FIG. 5. To effect utilization of the dolly for this purpose, it is merely necessary to move the dolly fifth wheel 82 along the track 80 to a position above the dolly axle 74.

Referring now to FIGS. 9 to 16, therein is illustrated a tractor chassis 24a, corresponding substantially to the relatively conventional chassis 24 illustrated in FIGS. 1 to 8, provided with an alternative embodiment of the inventive load distributing assembly. The chassis 24a is supported at the rearward end thereof by an axle 28a having drive wheels 32a mounted thereon. A fifth wheel 26a of conventional character is mounted on the chassis 24a for slidable movement therealong through means of a table 54a corresponding in structure and operation to the aforedescribed table 54. Pins 56a, corresponding to the pins 56, are provided to lock the table 54a at select locations along the chassis 24a. As can be seen from FIG. 9, the chassis 24a is comprised of lateral frame members 46a and 48a connected at their rearward end portions by a transversely extending plate 132. The plate 132, as can be seen from FIGS. 11 and 13, is inclined so as to provide a substantially open section at the rear end of the chassis 24a.

The embodiment of FIGS. 9 to 16 is completed by a dolly, designated in its entirety by the numeral 134, having a chassis 136. The chassis 136 is supported in substantially coplanar relationship to the chassis 24a (see FIGS. 13 and 14) by an axle 138 having wheels 140 mounted thereon. The chassis is supported on the axle 138 through means of conventional leaf springs 142. The chassis 136 is of relatively conventional nature and comprises side frame members 144 and 146 rigidly interconnected by a rear transverse frame member 148 and a forwardly disposed converging tongue 150. The side frame members 144 and 146 have slidably mounted thereon for longitudinal movement a table 152, which table in turn supports a fifth wheel 154. The fifth wheel 154 is mounted in conventional manner for pivotal movement about a transverse axis 156. Locking pins 158 are adapted to be extended through aligned openings (not illustrated) in the table 152 and the side frame members therebelow to fixedly secure the fifth wheel 154 at select locations along the chassis 136.

The structure of the dolly 134 also includes a removable leg 160 adapted to be secured to the tongue 150 to effect the support thereof and a coupling eye 162 mounted at the forward extremity of the tongue for pivotal movement about an axis extending longitudinally of the dolly. The eye 162 is of elongated configuration and includes a forward section 164 (see FIGS. 15 and 16) of circular cross section having a diameter substantially equal to that of a conventional kingpin. Through the latter construction, as will become more apparent subsequently, the eye 162 is adapted to be locked in the kingpin engaging jaws of a conventional fifth wheel. The eye 162 is mounted for pivotal movement through means of a cylindrical mounting stud 166 formed thereon and rotatably received in a bushing 168 mounted in the tongue 150. The mounting stud 166 is secured in the bushing 168 by a nut 170 threadably received thereon to one side of the bushing. A cotter pin 172 extends through the stud 166 to assure that the nut will not become disengaged therefrom.

The embodiment of FIGS. 9 to 16 is secured in load distributing condition by first moving the fifth wheel 26a forwardly of the axle 28a, then coupling the section 164 in the kingpin engaging jaws of the fifth wheel 26a, and finally moving the fifth wheel 154 to a position intermediate the axles 28a and 138. In this condition, load supported on the fifth wheel 154 will be transferred to the axles 28a and 138. The coupling jaws for the fifth wheel 26a are of conventional nature and are designated by the numeral 174. From FIGS. 9 and 12, it can be seen that the jaws 174 secure the eye 162 at a position wherein the tongue 150 is disposed beneath the fifth wheel 26a and in substantial alignment with the keyhole, designated by the numeral 176, formed in the table. FIG. 12 also illustrates that the fifth wheel 26a is mounted in conventional manner for pivotal movement about a transverse support axis 178.

Through the foregoing arrangement, the support chassis 136 of the dolly 134 is flexibly secured to the chassis 24a for universal movement with respect thereto. Specifically, when secured as illustrated in FIGS. 9, 11 and 12, the dolly chassis is pivotal about the transverse axis 178 of the fifth wheel 26a and the longitudinal axis of the mounting stud 166. Thus, the wheels 140 of the dolly 134 are free to accommodate irregular surfaces in a manner corresponding to the wheels 78 of the FIGS. 1 to 8 embodiment. During load distributing operation of the FIGS. 9 to 16 embodiment, lateral movement of the dolly chassis 136 relative to the tractor chassis 24a is substantially prevented by complementary wear shoes 180 and 182, respectively, provided on the chassis. These shoes, as can be seen from FIGS. 9 and 10, are provided to either side of the tongue 150.

When it is desired to employ the tractor and dolly of the FIGS. 9 to 16 embodiment in a conventional manner, it is merely necessary to disconnect the dolly chassis from the tractor chassis and return the fifth wheels 26a and 154 to the positions illustrated in FIGS. 13 and 14, respectively. In these positions, the fifth wheels are supported directly above the load supporting axles of the chassis on which they are mounted. If the dolly 134 is to be coupled to a conventional clevice, it is also necessary to turn the eye 162 to the horizontal position illustrated in FIG. 14. This is readily accomplished, since the eye is free to rotate about the axis of the mounting stud 166.

From the foregoing description, it is believed apparent that the present invention enables the accomplishment of the objects initially set forth herein. It is to be understood, however, that the invention is not intended to be limited to the specific details of the exemplary embodiments herein described, but rather is defined by the following claims.

What is claimed is:

1. In combination with a wheel supported draft vehicle having a load supporting chassis extending rearwardly therefrom and a vehicular semi-trailer having a first draft connection at the forward end thereof and support wheels at the rearward end thereof, an improved load distributing assembly for coupling said first draft connection to said draft vehicle, comprising:

(A) a wheel supported dolly having a load supporting chassis disposed in coplanar relationship with the chassis of said draft vehicle;

(B) connecting means to connect the chassis of said draft vehicle in draft and load supporting relationship to the chassis of said dolly for limited universal movement relative thereto, said means comprising:

(1) a carriage pivotally mounted on one of said chassis for limited universal movement relative thereto, said carriage having a coupling operatively associated therewith; and, (2) a carriage engageable element mounted on the other of said chassis for selective engagement with said carriage, said element having a coupling operatively associated therewith and adapted to cooperate with the coupling associated with said carriage to maintain said element and carriage in fixed engagement;

(C) a second draft connection adapted to be supported on and between said draft vehicle and dolly when the chassis thereof are interconnected, said draft connection being adapted to be coupled in engagement with said first draft connection to support the forward end of said trailer.

2. In combination with a wheel supported draft vehicle having a load supporting chassis extending rearwardly therefrom and a vehicular semi-trailer having a first draft connection at the forward end thereof and support wheels at the rearward end thereof, an improved load distributing assembly for coupling said first draft connection to said draft vehicle, comprising:

(A) a wheel supported dolly having a load supporting chassis disposed in coplanar relationship with the chassis of said draft vehicle;

(B) connecting means to connect the chassis of said draft vehicle in draft and load supporting relationship to the chassis of said dolly for limited universal movement relative thereto; said means comprising:

(1) a fifth wheel coupling mounted on the chassis of said draft vehicle for pivotal movement about an axis extending transversely thereof;

(2) a tongue fixed to and extending forwardly of the chassis of said dolly; and, (3) a pintle lockingly engageable in said fifth wheel and mounted on said tongue for a predetermined degree of free pivotal movement about an axis extending longitudinally of the chassis of said dolly when said pintle is lockingly engaged in said fifth wheel;

(C) a second draft connection adapted to be supported on and between said draft vehicle and dolly when the chassis thereof are interconnected, said draft connection being adapted to be coupled in engagement with said first draft connection to support the forward end of said trailer.

3. In combination with a wheel supported draft vehicle having a load supporting chassis extending rearwardly therefrom and a vehicular semi-trailer having a first draft connection at the forward end thereof and support wheels at the rearward end thereof, an improved load distributing assembly for coupling said first draft connection to said draft vehicle, comprising:

(A) a wheel supported dolly having a load supporting chassis;

(B) connecting means to connect the chassis of said draft vehicle in draft and load supporting relationship to the chassis of said dolly for up and down movement relative thereto, said means comprising:

(1) a fifth wheel mounted on the chassis of said draft vehicle for pivotal movement about an axis extending transversely thereof, said fifth wheel having an upwardly disposed load bearing surface;

(2) a tongue fixed to and extending forwardly of the chassis of said dolly, said tongue being adapted to be extended, at least partially, over said chassis and beneath the bearing surface of said fifth wheel;

(3) mating coupling means on said fifth wheel and tongue, respectively, adapted to couple said tongue in draft and load supporting relationship to said fifth wheel beneath the bearing surface thereof for movement therewith about said axis; and, (4) means to limit relative lateral movement between said chassis upon coupling of said tongue to said fifth wheel;

(C) a second draft connection adapted to be supported on and between said draft vehicle and dolly when said tongue and fifth wheel are coupled, said draft connection being adapted to be coupled in engagement with said first draft connection to support the forward end of said trailer at substantially the same level that said trailer would be supported on said fifth wheel.

4. An improved load distributing assembly according to claim 3 including an upwardly open channel formed on the chassis of said draft vehicle beneath the level of said fifth wheel and extending longitudinally of said chassis to an open rearward end and wherein, upon coupling of said tongue to said fifth wheel, said tongue extends through said channel.

5. An improved load distributing assembly according to claim 4, wherein:

(A) upon coupling of said tongue to said fifth wheel said tongue and channel assume a position with portions thereof to either side of their longitudinal centerlines in opposed facing relationship; and, (B) said means to limit lateral movement between said chassis comprise complementary wear surfaces disposed on said portions for slidable movement relative to each other upon assumption by said portions of opposed facing relationship.

6. An improved load distributing assembly according to claim 1, wherein:

(a) the coupling operatively associated with said carriage comprises a female wedge having a locking detent carried thereby; and, (b) the coupling operatively associated with said element comprises a male wedge adapted to snugly mate within said female wedge, said male wedge having carried thereby a detent engageable with the locking detent carried by said female wedge to lock said wedges in mating relationship.

7. An improved load distributing assembly according to claim 1, including:

(a) a first rectilinear track mounted on and extending longitudinally of said carriage;

(b) a second rectilinear track mounted on and extending longitudinally of said other chassis, said second track being adapted to assume a position juxtaposed in longitudinal alignment with said first track upon engagement of said carriage and element; and wherein, said second draft connection is slidably received on said first and second tracks for selective movement therealong and support thereby at a position between said draft vehicle and dolly when the chassis thereof are interconnected.

8. An improved load distributing assembly according to claim 1, wherein said carriage is mounted on said one chassis for limited universal movement by structure comprising:

(a) first trunnion means supported on and having a pivot axis extending longitudinally of said chassis;

(b) first bearing means received on said first trunnion for pivotal movement about the axis thereof;

(c) a beam secured to said first bearing means for pivotal support thereby about the axis of said first trunnion means;

(d) second trunnion means supported on said beam and having a pivot axis extending transversely of said chassis; and, (e) bearing means secured to said carriage and received on said second trunnion means for pivotal support about the axis thereof.

9. An improved load distributing assembly according to claim 2, including stop means cooperating between said respective chassis to limit the degree to which said chassis may move laterally relative to each other when connected.

References Cited by the Examiner

UNITED STATES PATENTS

| | | | |
|---|---|---|---|
| 2,351,151 | 6/1944 | Sattler | 280—423 |
| 2,495,943 | 1/1950 | Peterson. | |
| 2,682,420 | 6/1954 | Chelf | 280—407 |
| 2,776,846 | 1/1957 | Willock | 280—407 |
| 2,919,928 | 1/1960 | Hoffer | 280—81 |
| 3,246,912 | 4/1966 | Cunha | 280—407 |

LEO FRIAGLIA, *Primary Examiner.*